United States Patent
Lin et al.

(10) Patent No.: US 9,360,894 B1
(45) Date of Patent: Jun. 7, 2016

(54) WATER-RESISTANT ELECTRONIC DEVICE AND WATER RESISTANT KEY MODULE

(71) Applicant: HTC Corporation, Taoyuan (TW)

(72) Inventors: I-Hsuan Lin, Taoyuan (TW); Ying-Yen Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/620,198

(22) Filed: Feb. 12, 2015

(51) Int. Cl.
*G06F 1/16* (2006.01)
*H04M 1/02* (2006.01)
*H04B 1/3888* (2015.01)
*H04B 1/38* (2015.01)

(52) U.S. Cl.
CPC ............ *G06F 1/1656* (2013.01); *H04B 1/3888* (2013.01); *H04M 1/0202* (2013.01); *H04B 2001/3894* (2013.01)

(58) Field of Classification Search
CPC ....... H04M 1/0277; H04M 1/23; H04M 1/18; H04M 1/185; H04M 1/0202; G06F 1/1656; H04B 1/3888; H04B 2001/3894
USPC ............ 455/550.1, 575.1, 575.9, 90.3, 575.8; 361/679.09; 379/428.01, 433.01, 379/433.07
See application file for complete search history.

(56) References Cited

U.S. PATENT DOCUMENTS

| | | | |
|---|---|---|---|
| 7,259,339 B1 * | 8/2007 | Babella ................ | H01H 13/705 200/5 A |
| 7,355,137 B2 | 4/2008 | Kawasaki et al. | |
| 2005/0062619 A1 * | 3/2005 | Jellicoe ................ | G06F 3/0233 341/22 |
| 2012/0268879 A1 * | 10/2012 | Kim ..................... | H04M 1/0277 361/679.09 |
| 2015/0180127 A1 * | 6/2015 | Bernhard ............. | A63B 69/002 343/720 |

FOREIGN PATENT DOCUMENTS

| | | |
|---|---|---|
| TW | 461546 | 10/2001 |
| TW | 201424145 | 6/2014 |
| TW | 201428798 | 7/2014 |

OTHER PUBLICATIONS

"Office Action of Taiwan Counterpart Application", issued on Aug. 12, 2015, p. 1-p. 5.

* cited by examiner

*Primary Examiner* — Raymond Dean
(74) *Attorney, Agent, or Firm* — Jianq Chyun IP Office

(57) ABSTRACT

A water-resistant electronic device includes a casing, a key body, a first circuit board and an elastomer. The casing has an opening and a recess communicating with the opening. The key body is disposed in the opening. The first circuit board has a switch. The elastomer envelops the first circuit board and is embedded with interference fit in the recess to achieve a water-resistant effect. The key body is pressed to trigger the switch. Besides, a water-resistant key module is suitable for the water-resistant electronic device and includes the key body, the first circuit board and the elastomer above.

15 Claims, 3 Drawing Sheets

WATER-RESISTANT ELECTRONIC DEVICE AND WATER RESISTANT KEY MODULE

BACKGROUND OF THE INVENTION

1. Field of the Invention

The application relates to an electronic device, and more particularly, a water-resistant electronic device and a water-resistant key module therefor.

2. Description of Related Art

In recent years, electronic devices are usually equipped with keys for a user to press. The user presses the keys to trigger switch components interior to the electronic device for correspondingly turning on or waking up the electronic device, or for inputting instructions into the electronic device. In terms of physical keys, physical keys are arranged within openings of a casing of the electronic device, so that they are displaced when being pressed. However, since there is a gap between the physical keys and the casing, liquids (e.g., rain water or beverages) can easily enter inside the casing via the gap and thereby damage other components of the electronic device inside the casing. Therefore, for electronic devices that are within contact of liquids in their usage environment, water resistance measures are especially important.

SUMMARY OF THE INVENTION

The application is directed to a water-resistant electronic device for preventing infiltration of liquids.

The application is directed to a water-resistant key module suitable for a water-resistant electronic device for preventing infiltration of liquids.

The water-resistant electronic device of the application includes a casing, a key body, a first circuit board, and an elastomer. The casing has an opening and a recess communicating with the opening. The key body is disposed in the opening. The first circuit board has a switch. The elastomer envelops the first circuit board and is embedded with interference fit in the recess, wherein the key body is pressed to trigger the switch.

The water-resistant key module of the application is suitable for a water-resistant electronic device. The water-resistant electronic device includes a casing having an opening and a recess communicating with the opening. The water-resistant key module includes a key body, a first circuit board, and an elastomer. The key body is disposed in the opening. The first circuit board has a switch. The elastomer envelops the first circuit board and is embedded with interference fit in the recess, wherein the key body is pressed to trigger the switch.

In summary of the above, in the application, the key body is first disposed in the opening of the casing. Next, the elastomer enveloping the first circuit board is embedded with interference fit in the recess to prevent an external liquid from passing through a gap between the recess and the elastomer and thereby achieve a water-resistant effect.

To provide a further understanding of the aforementioned and other features and advantages of the application, exemplary embodiments, together with the reference drawings, are described in detail below.

DESCRIPTION OF THE EMBODIMENTS

Figure 1A:
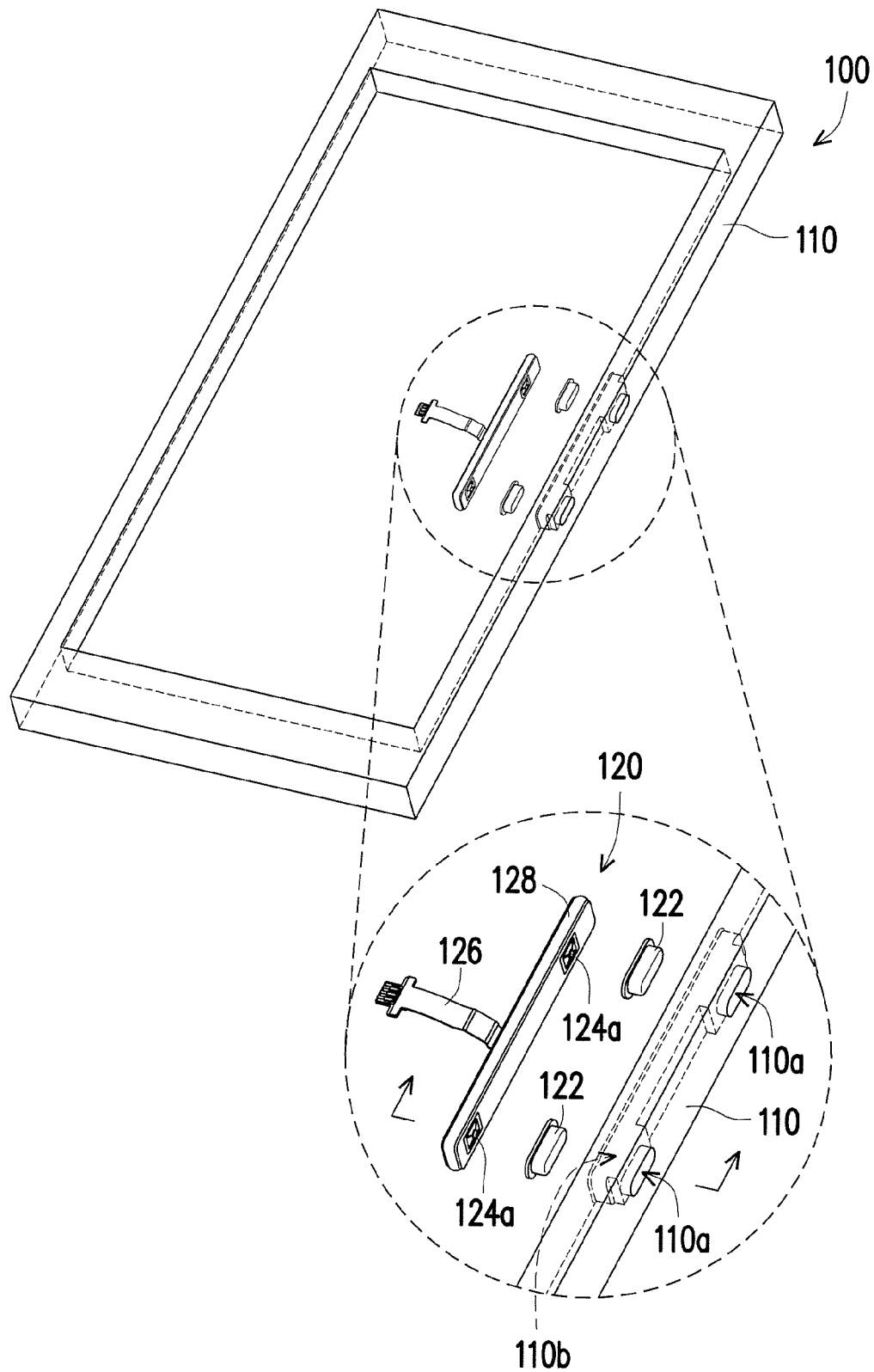
FIG. 1A is a perspective view of an electronic device of one embodiment of the application before assembly.
Figure 2A:
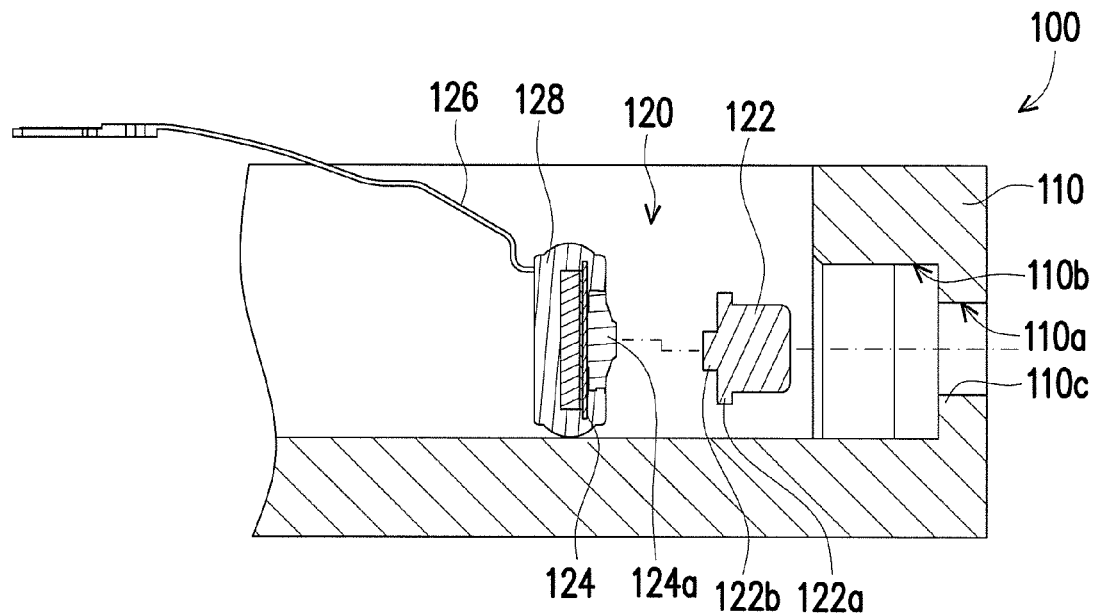
FIG. 2A is a perspective view of the electronic device of FIG. 1A after assembly.

Referring to FIGS. 1A and 2A, in the present embodiment, a water-resistant electronic device 100 is a portable electronic device such as a smartphone or a tablet computer, for example, but is not limited to these instances. The water-resistant electronic device 100 includes a casing 110 and a water-resistant key module 120. The casing 110 has at least one opening 110a and at least one recess 110b communicating with the opening 110a. The water-resistant key module 120 includes a key body 122, a first circuit board 124 and an elastomer 128. The first circuit board 124 has at least one switch 124a. The elastomer 128 envelops the first circuit board 124.

Figure 1B:
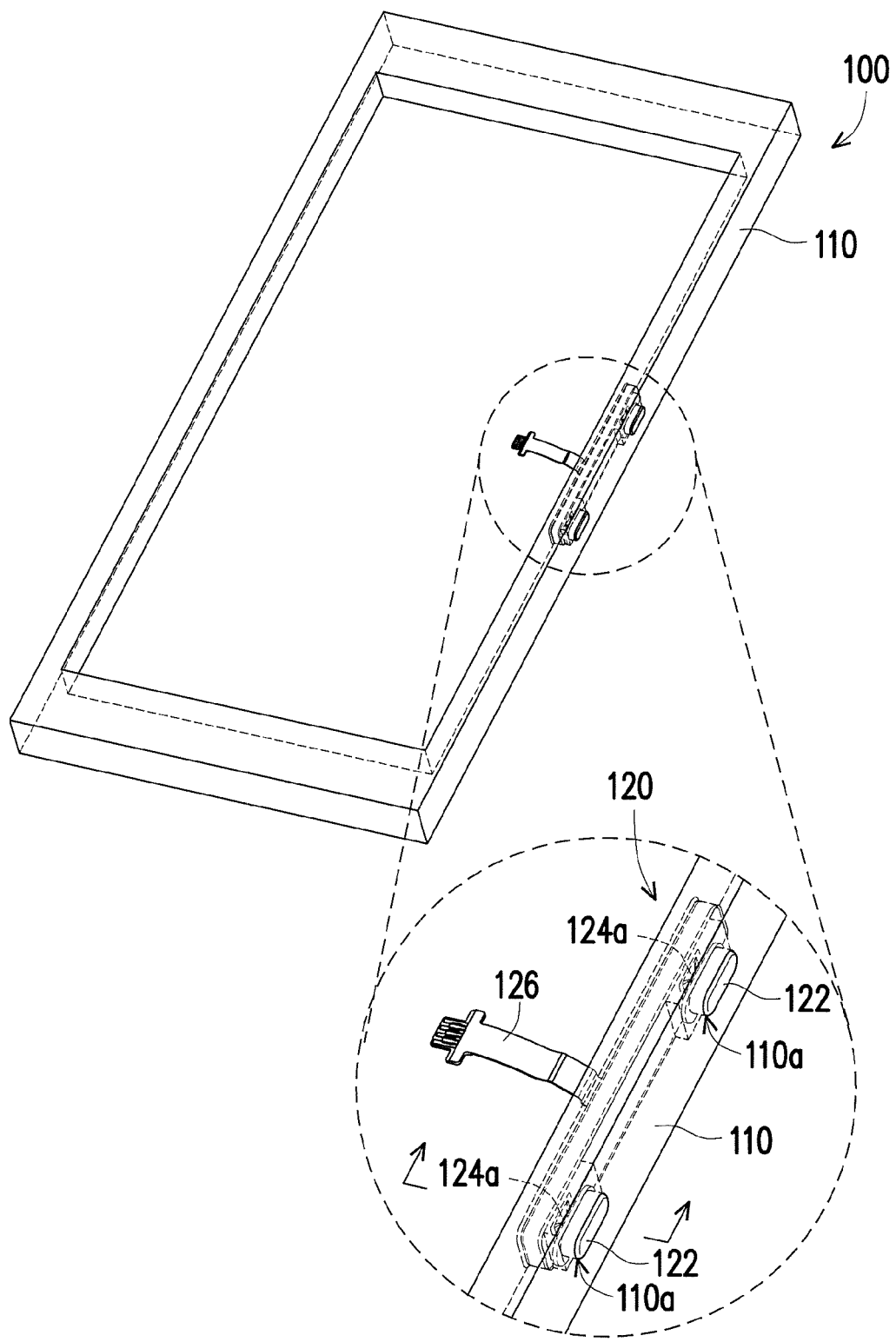
FIG. 1B is a cross-sectional view of the electronic device of FIG. 1A along a line I-I.
Figure 2B:
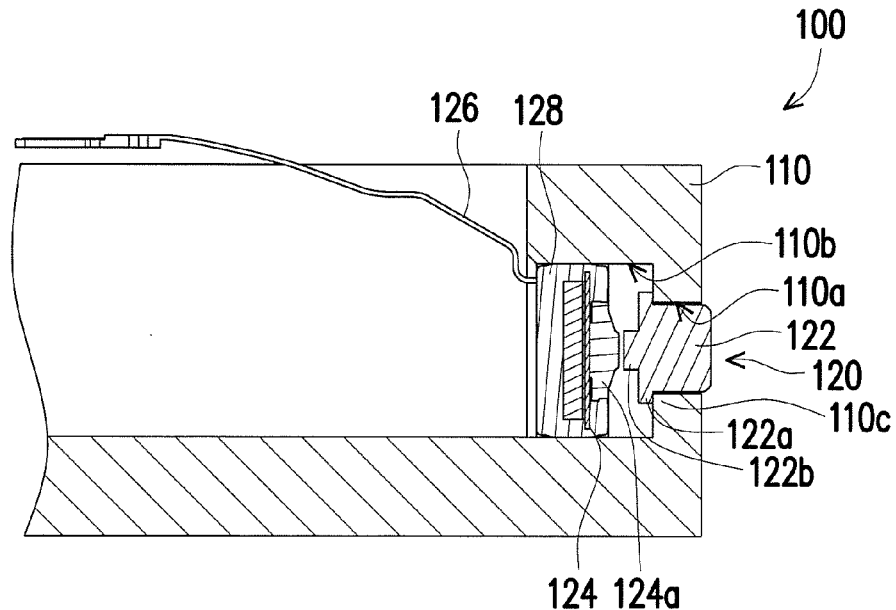
FIG. 2B is a cross-sectional view of the electronic device of FIG. 2A along a line II-II.

Referring to FIGS. 1B and 2B, in an assembly process, the key body 122 is first arranged in the opening 110a. Next, the elastomer 128 enveloping the first circuit board 124 is embedded with interference fit in the recess 110b to prevent an external liquid from entering inside the casing 110 via a gap between the recess 110b and the elastomer 128 and thereby achieve a water-resistant effect. Accordingly, the key body 122 may be pressed to trigger the switch 124a.

In the present embodiment, the opening 110a has a positioning shoulder portion 110c and the key body 122 has a positioning flange 122a, wherein the positioning shoulder portion 110c abuts the positioning flange 122a to limit a range of movement of the key body 122 relative to the casing 110.

In the present embodiment, the key body 122 has a contact protrusion 122b for triggering the switch 124a. If the switch 124a has a waterproof function, the elastomer 128 may expose the switch 124a for the contact protrusion 122b of the key body 122 to press or contact the switch 124a. If the switch 124a does not have a waterproof function, the elastomer 128 envelops the switch 124a. To be more specific, the switch 124a, for example, is a tact switch such as a dome switch, which is triggered by press of the contact protrusion 122b.

In the present embodiment, a material of the elastomer 128 includes rubber. Specifically speaking, the elastomer 128 may be formed by injection molding to envelop the first circuit board 124. In addition, the first circuit board 124 includes a flexible printed circuit (FPC) or a printed circuit board (PCB). Moreover, the first circuit board 124 may include a second circuit board 126, which extends outside the elastomer 128 to connect to other components (not illustrated) of the water-resistant electronic device 100 such as a motherboard or a module board.

Compared to conventional waterproof designs, the application integrates the elastomer 128 and the first circuit board 124, which not only provides a water-resistant function, but also reduces an overall thickness of the key module along a pressing stroke direction of the key.

In summary of the above, in the application, the key body is first disposed in the opening of the casing. Next, the elastomer enveloping the first circuit board is embedded with interference fit in the recess to prevent an external liquid from passing through a gap between the recess and the elastomer and thereby achieve a water-resistant effect.

Although the application is disclosed in the embodiments above, the embodiments are not meant to limit the application. Any person skilled in the art may make slight modifications and variations without departing from the spirit and scope of the application. Therefore, the protection scope of the application shall be defined by the claims attached below.

What is claimed is:

1. A water-resistant electronic device, comprising:
   a casing having an opening and a recess communicating with the opening;
   a key body disposed in the opening;
   a first circuit board having a switch; and
   an elastomer enveloping the first circuit board and fitted in the recess by interference with an inner wall of the recess, wherein the key body is pressed to trigger the switch.

2. The water-resistant electronic device according to claim 1, wherein the opening has a positioning shoulder portion, the key body has a positioning flange, and the positioning shoulder portion abuts the positioning flange to limit a range of movement of the key body relative to the casing.

3. The water-resistant electronic device according to claim 1, wherein the key body has a contact protrusion for triggering the switch.

4. The water-resistant electronic device according to claim 1, wherein the elastomer exposes the switch.

5. The water-resistant electronic device according to claim 1, wherein a material of the elastomer comprises rubber.

6. The water-resistant electronic device according to claim 1, wherein the first circuit board comprises a flexible printed circuit or a printed circuit board.

7. The water-resistant electronic device according to claim 1, further comprising a second circuit board which is connected to the first circuit board and extends to outside the elastomer.

8. A water-resistant key module for a water-resistant electronic device comprising a casing having an opening and a recess communicating with the opening, the water-resistant key module comprising:
   a key body disposed in the opening;
   a first circuit board having a switch; and
   an elastomer enveloping the first circuit board and fitted in the recess by interference with an inner wall of the recess, wherein the key body is pressed to trigger the switch.

9. The water-resistant key module according to claim 8, wherein the opening has a positioning shoulder portion, the key body has a positioning flange, and the positioning shoulder portion abuts the positioning flange to limit a range of movement of the key body relative to the casing.

10. The water-resistant key module according to claim 8, wherein the key body has a contact protrusion for triggering the switch.

11. The water-resistant key module according to claim 8, wherein the elastomer exposes the switch.

12. The water-resistant key module according to claim 8, wherein a material of the elastomer comprises rubber.

13. The water-resistant key module according to claim 8, wherein the first circuit board comprises a flexible printed circuit or a printed circuit board.

14. The water-resistant key module according to claim 8, further comprising a second circuit board which is connected to the first circuit board and extends to outside the elastomer.

15. A water-resistant electronic device, comprising:
   a casing having an opening and a recess communicating with the opening;
   a key body disposed in the opening;
   a first circuit board having a switch; and
   an elastomer enveloping the first circuit board and fitted in the recess by interference with an inner wall of the recess, wherein the key body is pressed to trigger the switch, wherein the opening has a positioning shoulder portion, the key body has a positioning flange, and the positioning shoulder portion abuts the positioning flange to limit a range of movement of the key body relative to the casing.

* * * * *